US011809635B2

(12) United States Patent
Wachner

(10) Patent No.: US 11,809,635 B2
(45) Date of Patent: Nov. 7, 2023

(54) COMPUTER SYSTEM AND METHOD FOR HUMAN-MACHINE INTERACTION

(71) Applicant: Treye Tech UG (haftungsbeschränkt), Mannheim (DE)

(72) Inventor: Anton Wachner, Mannheim (DE)

(73) Assignee: Treye Tech UG (haftungsbeschränkt), Mannheim (DE)

(*) Notice: Subject to any disclaimer, the term of this patent is extended or adjusted under 35 U.S.C. 154(b) by 0 days.

(21) Appl. No.: 17/806,601

(22) Filed: Jun. 13, 2022

(65) Prior Publication Data

US 2022/0300084 A1 Sep. 22, 2022

Related U.S. Application Data

(63) Continuation of application No. PCT/EP2020/083913, filed on Nov. 30, 2020.

(30) Foreign Application Priority Data

Dec. 13, 2019 (EP) .................................... 19216341

(51) Int. Cl.
*G06F 3/0481* (2022.01)
*G06F 3/0482* (2013.01)
(Continued)

(52) U.S. Cl.
CPC .............. *G06F 3/017* (2013.01); *G06F 3/012* (2013.01); *G06F 3/013* (2013.01); *G06F 3/0482* (2013.01); *G06V 40/20* (2022.01)

(58) Field of Classification Search
CPC .......... G06F 3/017; G06F 3/012; G06F 3/013; G06F 3/0482; G06V 40/20
See application file for complete search history.

(56) References Cited

U.S. PATENT DOCUMENTS 9,141,197 B2 * 9/2015 MacDougall ........... G06F 3/017
9,652,042 B2 * 5/2017 Wilson .................... G06F 3/017
(Continued)

FOREIGN PATENT DOCUMENTS

WO 2017096093 A1 6/2017

OTHER PUBLICATIONS

International Search Report and Written Opinion for PCT Application No. PCT/EP2020/083913, dated Feb. 8, 2021, 11 pages.

*Primary Examiner* — Jordany Nunez
(74) *Attorney, Agent, or Firm* — Brake Hughes Bellermann LLP

(57) ABSTRACT

In response to a current gesture performed by a user interacting with an application, a gesture detection module accesses a plurality of predefined control gestures, and compares the current gesture with the plurality of predefined control gestures. The gesture detection module detects whether the current gesture matches at least an initial partial gesture of a particular control gesture associated with at least one application function. A feedback generator module generates confirmation feedback for the user if the current gesture matches at least an initial partial gesture of the particular control gesture. The confirmation feedback encodes, for the user, at least a first information identifying the application function associated with the particular control gesture and a second information about a time interval remaining before the associated application function will be executed. The application triggers the associated function if the particular control gesture is completed during said time interval.

20 Claims, 7 Drawing Sheets

(51) Int. Cl.
    *G06F 3/0484*     (2022.01)
    *G06F 3/01*     (2006.01)
    *G06V 40/20*     (2022.01)

(56) References Cited

U.S. PATENT DOCUMENTS

| | | | |
|---|---|---|---|
| 10,775,998 B2* | 9/2020 | Morita | G06F 3/017 |
| 2010/0146455 A1* | 6/2010 | Wilson | G06F 3/017 |
| | | | 715/863 |
| 2010/0199221 A1* | 8/2010 | Yeung | G06V 40/20 |
| | | | 715/850 |
| 2010/0281438 A1* | 11/2010 | Latta | G06F 3/017 |
| | | | 715/863 |
| 2011/0173574 A1* | 7/2011 | Clavin | G06F 3/017 |
| | | | 715/863 |
| 2012/0127109 A1* | 5/2012 | Nishio | G06F 3/04883 |
| | | | 345/173 |
| 2013/0271360 A1 | 10/2013 | Hildreth et al. | |
| 2014/0104161 A1* | 4/2014 | Liao | G06F 3/0304 |
| | | | 345/156 |
| 2014/0201666 A1 | 7/2014 | Bedikian et al. | |
| 2018/0018071 A1* | 1/2018 | Chabrier | G06F 3/04842 |
| 2018/0364810 A1* | 12/2018 | Parshionikar | G06F 3/013 |
| 2020/0275029 A1* | 8/2020 | Son | H04N 23/632 |

* cited by examiner

COMPUTER SYSTEM AND METHOD FOR HUMAN-MACHINE INTERACTION

CROSS REFERENCE TO RELATED APPLICATION

This application claims priority to, and is a continuation of, PCT/EP2020/083913 filed on Nov. 30, 2020, and entitled "Computer System and Method for Human-Machine Interaction," which in turn claims priority to EP Application No. 19216341.8 filed on Dec. 13, 2019, both of which are hereby incorporated by reference in their entireties.

TECHNICAL FIELD

The present description generally relates to systems for facilitating interaction of humans with machines, and in particular, relates to methods, computer program products and systems for interacting with applications of an electronic device via gesture control.

BACKGROUND

The control of software applications via gestures is well known in the art. For example, drag-and-drop actions performed by a user via a touch display are used to move graphical object representations (e.g., icons). In interactive gaming (e.g., games running on a Microsoft X-Box or a Nintendo Play Station) sensors are used to detect gestures performed by the users involving the entire body of the user (e.g., waving arms or jumping). Sometimes, handicapped users may not have the capability to move all body parts which are required for performing standard gestures with their bodies to appropriately control of software applications. As a remedy, eye tracking solutions are known to allow such handicapped users to perform control gestures by the gaze direction of their eyes. However, prior art solutions rely on a point-of-gaze approach which does not solve the so-called Midas Touch problem. This is a metaphor used in the eye tracking literature. King Midas was able to turn everything he touches into gold. As a consequence, he could not use his hands as normal hands to perform daily simple tasks. When eye gaze is used as user interaction mechanism to control a computer system, the basic function of the eye, namely to look and to perceive visual information, needs to be distinguished from any deliberate interaction with the computer systems. Otherwise, it results in a Midas Touch.

However, such prior art gesture based control systems require the users to know exactly which gesture needs to be performed and how it needs to be performed to trigger a certain control action. Especially in the case of handicapped people it may be difficult to perform such gestures in a way as it is expected by the system. In such cases, control actions may fail because the system does not recognize the gesture performed by the user as a trigger to execute a corresponding function as intended by the user.

SUMMARY

Hence, there is a need for providing improved methods and systems to enable a user to control software applications via gestures more reliably so that the software behaves as intended by the user in response to the user's gestures.

This technical problem is solved by a computer system, a computer-implemented method and a computer program product as disclosed in the independent claims. The disclosed embodiments include a computer-implemented method, computer system and computer program product for controlling an application running on a computing device.

In one embodiment, a computer system is provided for controlling an application running on a computing device. The computing device may be a desktop computer with a respective user interface. It may also be a mobile computing device, such as for example, a smartphone or tablet computer. The computer system is communicatively coupled with the computing device. In one embodiment, the computer system can be the same as the computing device. In this case, the computer system itself is running said application.

The computer system has an interface to receive a current gesture performed by a human user while the user interacts with the application. The current gesture may be associated with the user's intention to trigger a particular application function. When referring to "receiving a current gesture" it is meant that the system receives an image sequence representing a gesture currently performed by the user. For example, the interface may receive an image sequence recorded by a digital camera with the image sequence showing the user at different points in time while performing the current gesture. For example, the user may perform a movement with one of his/her body parts, including but not limited to an arm movement, a leg movement, a head movement, or an eye movement. In the case of handicapped users who are not able to perform movements with their legs or arms, sometimes gestures performed by the user's head or eyes are the only way for the user to interact with the application. In other words, in certain embodiments, the current gesture performed by the user may include a movement or a posture of the head of the user, or it may include a movement or a viewing direction of the user's eyes.

When interacting with the application, the user tries to perform a gesture which triggers a particular function of the application. For example, a user may look at a display of the application device where a graphical user interface (GUI) of the application is visualized. Typically, such a GUI provides informational user interface objections and interactive user interface objects. Interactive user interface (UI) objects can be buttons, input fields, etc. When the user selects such an interactive UI object, an application function associated with the respective interactive UI object is triggered (executed). For example, by executing an appropriate gesture, a user may push on a "Next" of "Previous" button to cause the application to display either a previously shown or a coming image on the screen. A skilled person is well familiar with different types of application functions which can be triggered via corresponding interactive UI objects.

The system can access a control gesture storage module storing a plurality of predefined control gestures. The control gesture storage module may be an integral component of the computer system or it may be a remote storage device with a respective interface which allows to provide the predefined control gestures to the computer system. Each predefined control gesture describes a gesture which when performed by the user and recognized by the system triggers the execution of an associated application function. Each application which is subject to gesture control is associated with a respective control gesture. Thereby, within a particular application context, each application function is associated with a dedicated control gesture which is unique for the particular application context. For example, an application context is defined by the current GUI screen displayed to the user. In other words, with each application function on a particular screen a different control gesture is associated.

The application context changes when the interaction of the user with the application changes to a new screen with new interactive UI objects representing a set of application functions different from the previous screen. In this case, the control gestures associated with the applications functions of the previous screen may now be associated with other application functions in the current screen. Also in case a user triggers an application function representing a menu of hierarchically ordered sub-functions the application context changes because a new layer of application functions is invoked by the interaction with the menu function. In this case, the same control gesture which was used to invoke the menu function may now be associated with a sub-function at lower level of the function hierarchy.

The predefined control gestures are composed of corresponding partial gestures. For example, a control gesture "moving head to the right" may be composed of different partial "left movement" gestures of the head up to a final left position which in total result in the entire control gesture. Similarly, any other control gesture can be broken down into partial movements (partial gestures) which, when combined, describe the sequence of movements defining the complete control gesture. Advantageously, the predefined control gestures may be learned by the system based on training data provided by the respective user. For example, a neural network can be trained to recognize gestures performed by a particular user. This allows to only include control gestures which can actually be performed by that user. Alternatively, predefined gestures may be used which have been defined commonly for all kinds of different users.

The system further has a gesture detection module to compare the received current gesture with the plurality of predefined control gestures. Techniques for gesture detection based on image sequences are well known in the art. The gesture detection module now detects if the current gesture matches at least an initial partial gesture of a particular control gesture associated with an application function shown on the current application UI. In other words, the gesture detection module is aware of all predefined control gestures which are associated with the application functions of the current application context. When the user starts to perform the current gesture the gesture detection module checks if the initial partial gesture performed by the user matches the initial part of any of the control gestures associated with the application functions in the current application context. The gesture detection module may be configured to filter out outliers in the performed gestures which can occur in particular with handicapped users. Such an outlier filter can be implemented by introducing a certain degree of tolerance into the gesture detection allowing jumps in the execution trajectory to a predefined extent. A jump in this context is meant to be an ad hoc deviation from an expected predefined gesture. For example, a smooth movement to the right may be expected which is however interrupted by a short upward movement, but then continued in accordance with the predefined gesture. Such jumps are characterized in that they are shorter than a time interval which a user typically needs to recognize that he/she deviates from the intended gesture. The short upward movement would then be filtered out as an outlier.

In case the gesture detection module detects such a match, a feedback generator module of the system is invoked. The feedback generator module generates confirmation feedback for the user if the current gesture matches at least an initial partial gesture of a particular control gesture. The confirmation feedback may be provided to the user via the application or via appropriate device functions. Thereby, the confirmation feedback encodes and communicates, in a format perceptible by the user, at least a first information identifying the application function associated with the matching control gesture and a second information about a time interval remaining before the associated application function will be executed. It is to be noted that the information about the remaining time interval is not meant to be an exact number of seconds remaining—although such an exact timer function is one possible implementation. Rather, the provided information about the remaining time interval may simply convey to the user information about the remaining time portion in relation to the total time interval which is defined between the moment a function is identified and the triggering of said function. For example, the user can get an idea from the second information that, when continuing the gesture for about the same time as the gesture has already been performed, the corresponding function will be triggered. For example, for communicating such relative information the elapsed time may be shown on a progress bar in relation to the total time until the function is triggered. Persons skilled in user interface design may use a plurality of alternative implementations to convey such relative time information.

In other words, the confirmation feedback conveys to the user if the currently performed gesture is a valid control gesture and, if so, which application function is associated with this control gesture. It may occur that a user performs the current gesture by accident without the intention to trigger a particular application function. In this case it would be disadvantageous if the application would execute the respective function as soon as the respective control gesture is recognized by the system. Rather, it is advantageous to allow the user to move to a neutral position to prevent the execution of the function. This is achieved by the second information about the time interval remaining before the function will be executed. Once the user recognizes via the first information of the confirmation feedback that he/she has performed a gesture which corresponds to a predefined control gesture and would lead to the execution of an associated function if continued, the user also receives the information about when this function will be executed. Again, the "when" in the context of this document is not necessarily providing the exact number of seconds remaining, but also includes relative time information as explained above. This provides additional time to the user to stop the current gesture and move to a neutral position. In other words, once the system detects that the user has moved to a neutral position during the time interval indicated by the second information, the system interprets the moving to the neutral position as a gesture performed by the user to prevent the triggering of the particular application function. It is to be noted that the neutral position may correspond to a natural position of the user, such as for example when looking towards the center of a screen or at an edge of the screen. However, the neutral position may even not be associated with a screen at all, but may be associated with a particular point in space which lies outside the start and end points of predefined gestures. The time interval which is used to allow the user to move to a neutral position may be customizable so that each user can configure the system in a way which is appropriate with regards to the capabilities of the user. In general, a neutral position (or neutral viewing area) is defined as a position where the user can freely move the head/eyes without making any input which could trigger an application function. Therefore, this approach addresses the so-called Midas touch problem. The user interface becomes more selective and robust in the sense that not every performed current gesture which is associated with a control gesture immediately triggers a corresponding function. Rather, the confirmation feedback allows the user to continue or stop the gesture in accordance with the user's intention.

In one embodiment, the confirmation feedback may further encode a third information about how to continue the current gesture to trigger the execution of the associated function. For example, if the user intends to trigger an application function associated with an interactive UI object at the left side of the current appellation screen the user may turn the head to the left. The gesture detection module may detect the initial partial gesture of the associated control gesture "move head to the left". In case the user stops with the current gesture shortly after having reached a posture which is sufficient for the recognition of the initial partial gesture the system waits for the completion of the current gesture to match the respective complete control gesture. The time interval information only conveys to the user how long the user has still time to complete the entire control gesture. However, it can be advantageous for the user to also provide the information about how to complete the control gesture.

For example, in cases of handicapped persons it may be difficult to turn the head beyond a certain threshold angle. The system may have learned the corresponding control gesture based on this threshold angle which can still be conveniently reached by the user. However, the user may have stopped with the turn movement in the current gesture at an angle below the threshold angle. The third information of the confirmation feedback conveys the information to the user that, in order to trigger the associated application function, the turn movement needs to be continued until the threshold angle is reached. The confirmation feedback thereby can be provided in a visual manner. For example, an arrow or a moving UI object may be displayed to indicate to the user that the current movement needs to be continued in the indicated direction within said time interval. Other visual indicators may be used, such as color or shape animation of the corresponding interactive UI objects. It is to be noted that such visual indicators can be peripherally placed on the application GUI to not distract the user from the actual application content because there is no need that the user puts a focus on the visual indicator. Rather, it is sufficient when the user peripherally observes the visual indicator. For example, a changing color or a changing transparency level of a visual indicator at the edge of the application GUI may indicate to the user whether the current gesture is continued as expected to trigger a respective function even if the visual indicator is outside the user's point of fixation.

Also other feedback modes may be used such as audio or haptic confirmation feedback. In an audio feedback example, a change from lower to higher frequencies of a feedback sound may indicate that the gesture is continued in the right manner. In a haptic feedback example, the intensity of the vibration of a smartphone may be used to indicate whether the gesture is continued in the right manner. UI design experts can design all kinds of further confirmation feedback information based on generally known UI design principles.

It may occur that in a given application context more than one associated control gesture start with the same initial partial gesture. In such embodiments, the confirmation feedback may further encode information regarding a plurality of options of how to continue the current gesture, with each option associated with a different function to be triggered in case of the successful completion of a respective control gesture. For example, in case multiple interactive UI objects are placed at the left edge of the application screen but at different height positions of the screen, an initial partial gesture to the left may be associated with all of those interactive UI objects. In this case, the confirmation feedback may provide information regarding all application functions reachable on the left side of the screen and, in addition, may provide information if the current gesture needs to be continued unchanged or needs to be combined with an up- or down-movement to reach the various UI objects. It is to be noted that successful completion may also be achieved when a certain head posture or gaze direction is maintained for a while by the user.

In the case of visual confirmation feedback, the feedback is typically provided via the application in the application screen. In case of audio or haptic confirmation feedback, the feedback may be generated by respective device functions (e.g., audio function or vibration function of the computing device) based on the output of the feedback generator module.

If the gesture detection module detects that the particular control gesture is completed by the user during said time interval the application triggers the execution of the associated function.

In one embodiment, a computer program product is provided that, when loaded into a memory of a computing device and executed by at least one processor of the computer system, causes the computer system to perform the functions as disclosed herein.

In one embodiment, a computer-implemented method is executed by said computer system with the steps as disclosed herein.

Further aspects of the description will be realized and attained by means of the elements and combinations particularly depicted in the appended claims. It is to be understood that both, the foregoing general description and the following detailed description are exemplary and explanatory only and are not restrictive of the described embodiments.

DETAILED DESCRIPTION

Figure 1:
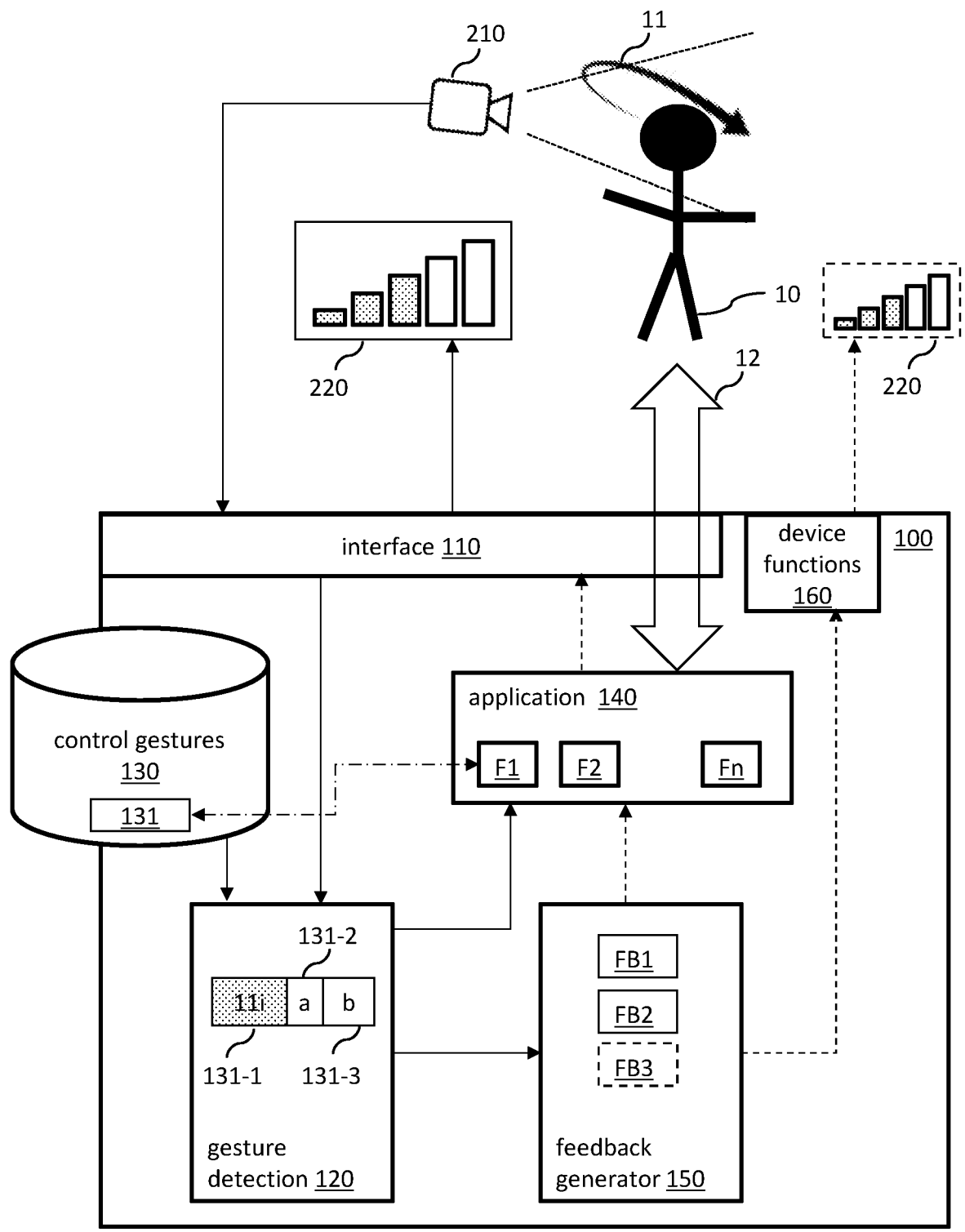
FIG. 1 shows a simplified diagram of an embodiment of a computer system for controlling an application running on a computing device via gestures.
Figure 2:
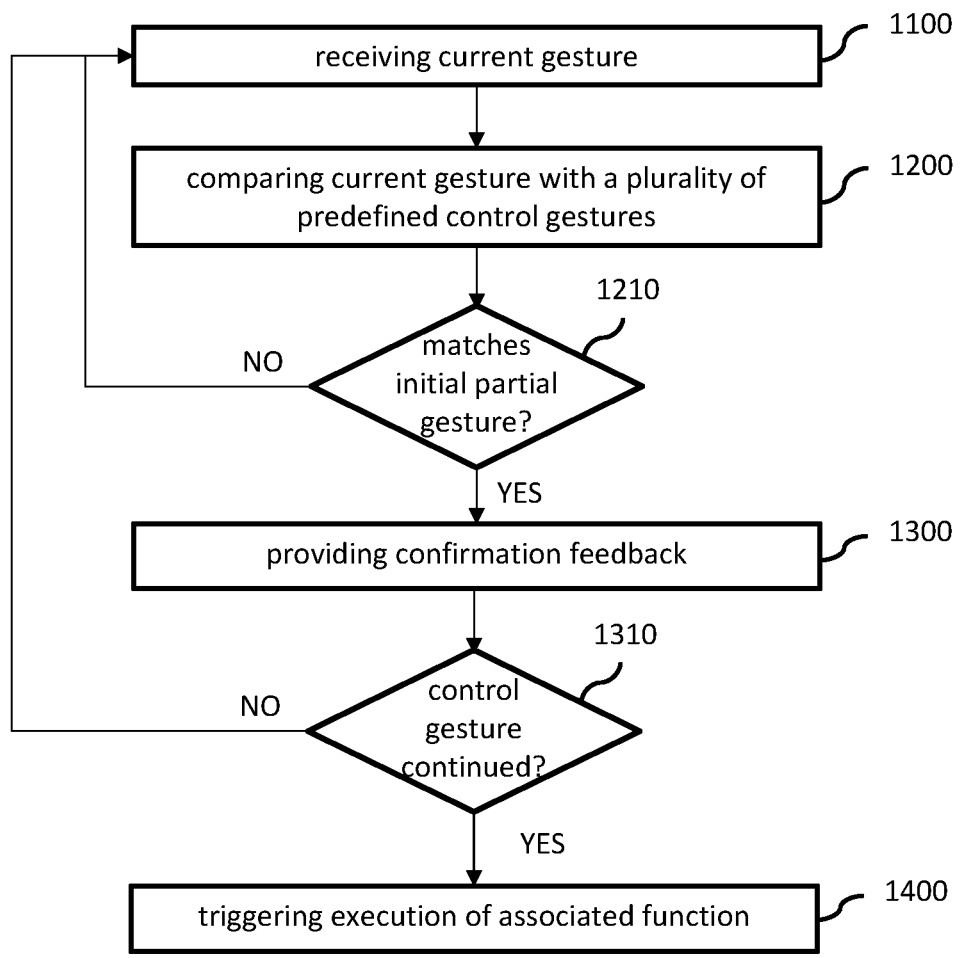
FIG. 2 is a simplified flowchart of a computer-implemented method for controlling an application with gestures which can be performed by embodiments of the computer system.

FIG. 1 shows a simplified diagram of an embodiment of a computer system 100 for gesture based control of an application 140 running on a computing device. FIG. 2 is a simplified flowchart of a computer-implemented method 1000 for controlling an application with gestures. The method 1000 can be performed by embodiments of the computer system 100. Therefore, FIG. 1 is described in the context of FIG. 2 and the following description refers to reference numbers of both figures.

The system 100 improves gesture-based control of software applications by human users. The disclosed concepts may be advantageous for handicapped users who have difficulties in interacting with such applications. The disclosed approach allows for robust and reliable user interaction between the handicapped user and the GUI of the application to ensure execution of application functions in accordance with the user's intention. In the example embodiment of FIG. 1, the application 140 is run on the computer system 100 itself. However, the application 140 could also be executed by another computing device which is communicatively coupled with the computer system 100 via standard communication interfaces so that modules of the computer system 100 can exchange data with the application 140. In the example, the application 140 has interactive UI objects F1, F2, Fn which represent corresponding application functions. To execute an application function, the user needs to interact with the corresponding interactive UI object. In the following, the reference numbers F1 to Fn also refer to the application functions associated with the respective interactive UI objects.

The system 100 has an interface 110 to receive a current gesture 11 performed by a human user 10 while the user interacts 12 with the application 140. The current gesture is recorded by a corresponding sensor device. In the example, a camera device 210 is used with a field of view (indicated by dotted lines) directed to the user 10 so that the camera can capture movements of the user (e.g., movements of the user's head or eyes). The output of the camera is provided to the computer system 100 via interface 110. In other embodiments, different sensors may be used for capturing gestures 11 of the user. For example, a touch sensitive display may be used to capture touch gestures of the user. In such an embodiment, the computing device with the touch sensitive display may also be the computing device running the application in which case the user would interact 12 with the application 140 via said touch sensitive display.

A gesture detection module 120 of the system is configured to extract the current gesture 11 information from the received sensor input. In the embodiment using the camera 210, the gesture detection module 120 extracts the current gesture information from the incoming image sequence. In a touch display implementation, the gesture detection recognizes gestures based on the user's finger position when performing finger movements while the user's finger is in contact with the touch display. In one embodiment, the control gestures performed by the user are performed by movements of the user's head or even just with the user's pupils.

When a user performs a current gesture 11 the corresponding movement can be split into multiple partial gestures 11i, a, b. Partial gestures are explained in more detail in the context of FIG. 7. The gesture detection module 120 recognizes such partial gestures and can compare the initial partial gesture 11i of the current gesture 11 (e.g., the initial part of the movement when the user starts turning the head into one direction) with the initial parts 131-1 of predefined control gestures 131 in a control gesture storage 130. The control gesture storage 130 may be an integral part of the computer system 100 (e.g. an integrated database component) or it may be a remote storage device accessible by the computer system 100. A predefined control gesture 131 is composed of corresponding partial gestures 131-1, 131-2, 131-3 which describe the motion sequence of the entire control gesture 131. The gesture detection module 120 can now compare 1200 gesture input obtained by the sensor 210 with the predefined control gestures in the control gesture storage 130.

For a particular internal state of the application (i.e. a particular application context as, for example, reflected by the current application GUI or an application audio interface) there is a 1:1 relation between the application functions represented by their interactive UI objects F1 to Fn and respective predefined control gestures associated with the respective application functions. In the example of FIG. 1, for simplicity reasons, only the association between predefined control gesture 131 and function F1 is illustrated by a dash-dotted double arrow. However, each application function represented by the UI objects F1 to Fn is actually associated with a dedicated predefined control gesture. And each of such control gestures is composed of an initial partial control gesture and at least a further partial control gesture completing the predefined control gesture.

Once the gesture detection module 120 identifies a match 1210 between the received initial current gesture portion 11i configured and the initial gesture portion 131-1 of a predefined control gesture 131, a feedback generator module 150 of the system 100 is invoked. The feedback generator module 150 generates confirmation feedback 220 for the user which is finally provided to the user 10 via a corresponding feedback channel. The confirmation feedback 220 encodes, in a format perceptible by the user 10, at least a first information FB1 identifying the application function F1 associated with the particular control gesture 131 and a second information FB2 about a time interval remaining before the associated application function (represented by UI object F1) will be executed. The feedback channel can be the graphical UI of the application 140 in case of a visual feedback, or it may be provided via a particular device function (e.g., audio output channel or vibration output channel) of the computer system in case audio feedback or haptic feedback is generated.

The gesture detection now continues to evaluate the current gesture 11 by checking 1310 if the user performs the expected partial gestures 131-2, 131-3 during said time interval. In the example, the partial gestures a, b performed by the user 10 match with the expected partial gestures of the control gesture 131. Once the gesture detection module 120 detects the completion of the current gesture as a user input reflecting the control gesture 131, the application is notified about the completion. If the control gesture 131 was completed during said time interval, the application 140 triggers the execution of the associated function F1.

Figure 3:
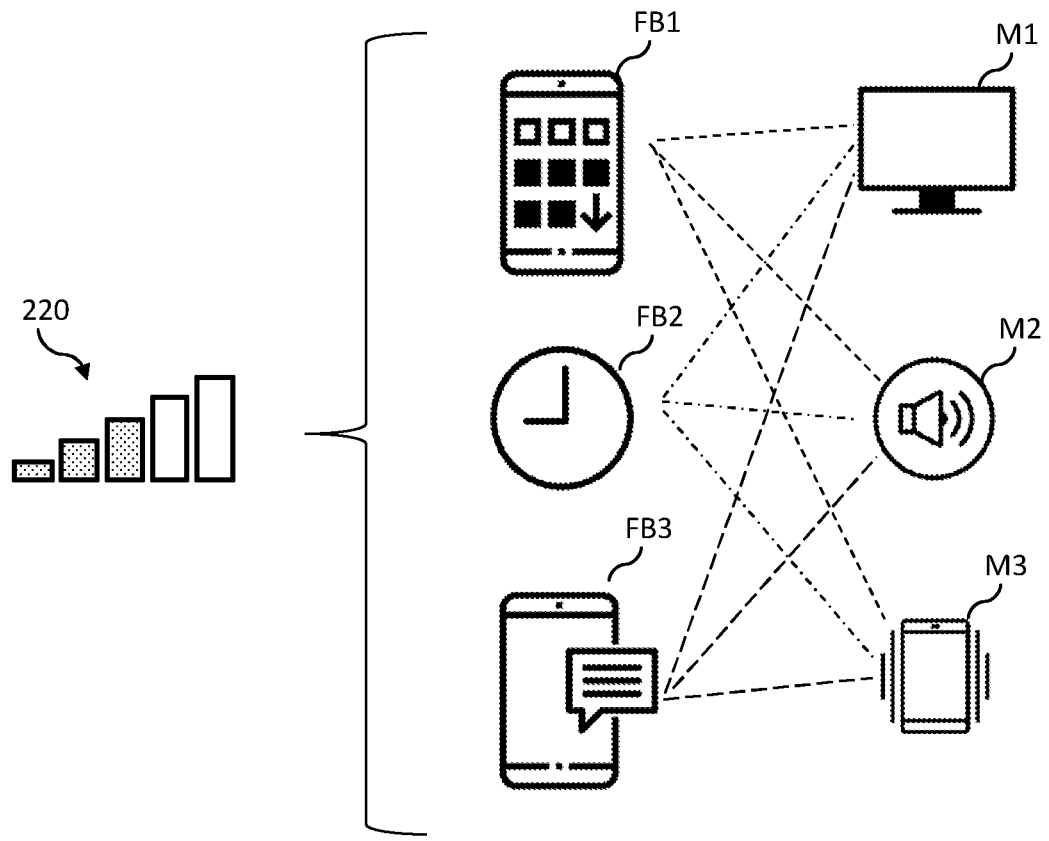
FIG. 3 illustrates how different information types of confirmation feedback information can be provided to a user via different feedback modes.

FIG. 3 illustrates various feedback information elements FB1 to FB3 of the confirmation feedback 220 and feedback modes M1 to M3 which can be used to convey the confirmation feedback via the corresponding feedback channels to the user. The first feedback information element FB1 provides information to the user indicating the application function which is identified as the application function being associated with the predefined control gesture matching the current initial partial gesture performed by the user. For example, FB1 can be provided to the user via the visual channel in the form of visual feedback (feedback mode M1) by highlighting the corresponding matching application function. This may be implemented via a color coding, an animation (e.g. blinking or enlarging the corresponding interactive UI object), or the like.

Figure 5:
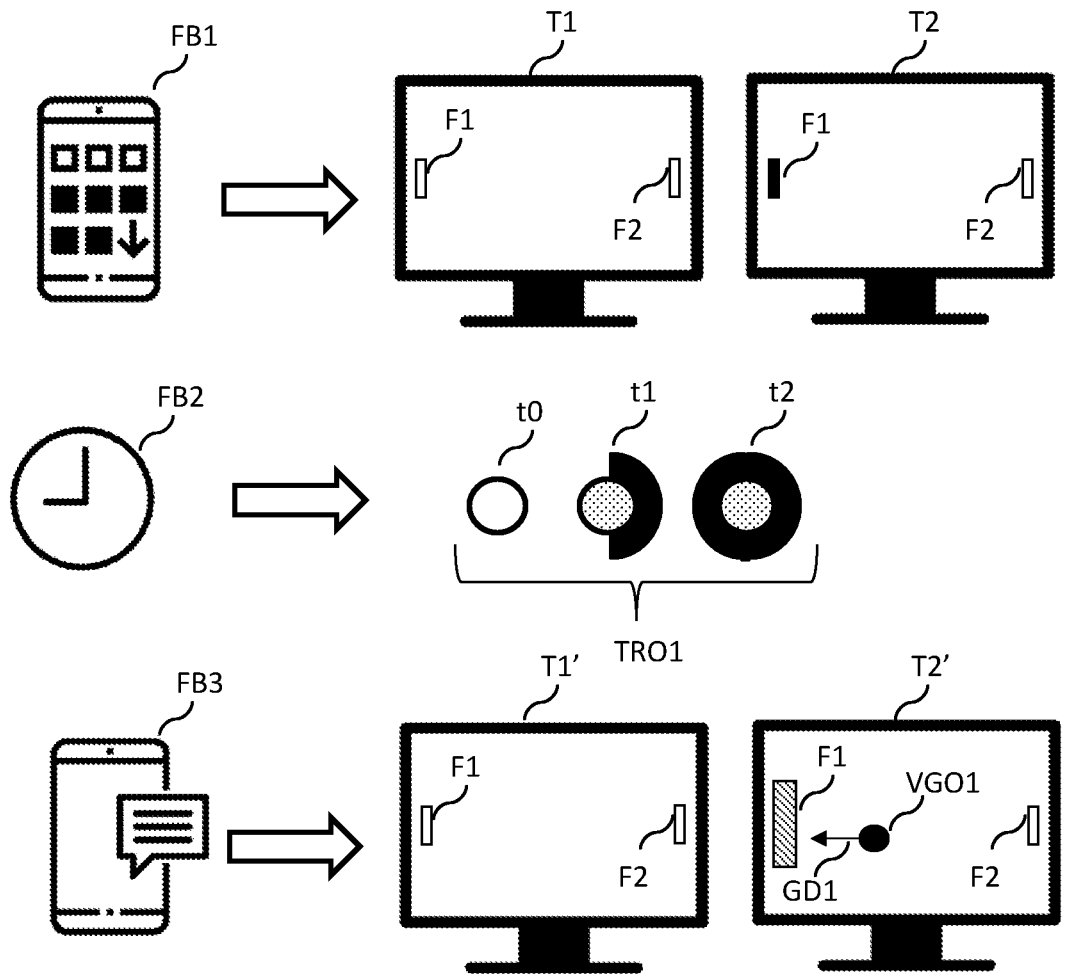
FIG. 5 illustrates examples of confirmation feedback provided in the visual feedback mode.
Figure 6:
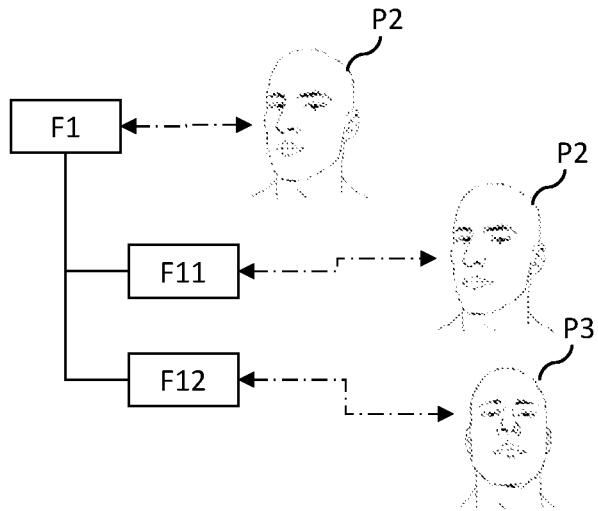
FIG. 6 illustrates an example embodiment for associating control gestures with application functions in case of a function hierarchy.

Turning briefly to FIG. 5, an example is shown for FB1 where at a time T1 the user is not performing a current gesture which matches a predefined control gesture. That is, at T1 the user interacts with the system in a neutral position. Then, the user performs a current gesture which is interpreted by the system to be associated with application function F2. The corresponding interactive UI object is now highlighted to indicate that F1 is now a subject to execution. A person skilled in graphical UI design may select other representation of FB1 suitable to convey the visual feedback to the user.

Turning back to FIG. 3, in another example embodiment, FB1 can be provided using the audio feedback mode M2. This feedback is directly provided via the audio function of the user's device. For example, a speech generation function of the feedback generator may be used to output a spoken statement such as "You selected application function one for execution". In a third example embodiment, an indicator for FB1 can be provided using the haptic feedback mode M3. For example, if the user has performed a current gesture leading to the triggering of an application function associated with an interactive GUI object at the left edge of the screen, a corresponding vibration sequence may be output via the vibration alarm function of the device. For example a single vibration alarm may indicate the application function at the left edge. A sequence of two alarms may indicate an application function at the top of the screen, and so on.

The second feedback information element FB2 provides information to the user indicating a time interval remaining before the indicated application function will be executed. This time interval may be customizable by the user so that the user can set a response time for the system. This customizing option is appropriate to personalize and optimize the user interaction and can be advantageous for taking into account potential handicaps of the user. For example, FB2 can be provided to the user via the visual channel in the form of visual feedback (feedback mode M1) by displaying an animated time representation object.

Turning briefly to FIG. 5, an example is shown for FB2 where a time representation object TR1 is illustrated a three different points in time t0, t1, t2. At time t0, the system has detected a match of initial partial gestures and indicates to the user with a time circle that a corresponding function is associated. At time t2, TRO1 indicates via the black half circle that already half of the time interval before the triggering of the function has elapsed. At t3, the entire time interval has elapsed and the function is triggered at that moment. In the example of FIG. 5, the color/pattern of the inner circle of TRO1 also changes over time providing additional feedback information to the user which will be discussed in the context of FB3. A person skilled in graphical UI design may select other representation of time representation objects suitable to convey the visual feedback to the user (e.g., a clock, a time bar, etc.).

Turning back to FIG. 3, in another example embodiment, FB2 can be provided using the audio feedback mode M2. This feedback is directly provided via the audio function of the user's device. For example, a speech generation function of the feedback generator may be used to output a spoken statement such as "15 seconds left before function launch". Alternatively, a change of the frequency of a beep tone may indicate the remaining time interval. For example, a low frequency tone indicates 15 seconds left and a high frequency tone indicates 1 second left. The threshold frequencies can be again customized by the user and the frequency continuously increases while the time interval elapses.

In a third example embodiment, an indicator for FB2 can be provided using the haptic feedback mode M3. For example, when an application function is indicated, the vibration alarm function may initially send a sequence of short vibration alarms with relatively long time intervals between the pulses. The closer the remaining time interval gets to its end the shorter become the intervals between the pulses. In other words, the more the system approaches the function launch time point the stronger the haptic sensation for the user. Of course, a skilled person may chose other appropriate haptic feedback vibration patterns to indicate the remaining time interval to the user. Again, the time distance between the alarm pulses can be customized by the user to match the physical capabilities of the user.

The optional third feedback information element FB3 provides information to the user about how to continue the current gesture to trigger the execution of the associated function. For example, there are many design options for providing FB3 to the user via the visual channel in the form of visual feedback (feedback mode M1).

Turning again briefly to FIG. 5, in the example regarding FB2, FB3 is actually implicitly encoded via the color/background pattern of the inner circle. Other visual representations, such as for example encoding via variation of contrast, color saturation, line sharpness, etc. are options which may be selected by a person skilled in GUI design. In the example at t0, the inner circle is filed white. The color indicates to the user that the initial partial current gesture was recognized, but also that the current gesture has not yet been completed to match the entire corresponding predefined control gesture. For the user, this conveys the implicit instruction to continue with the current gesture until the corresponding interactive UI object is in focus. At t1, the color/pattern of the inner circle has changed to a dotted background indicating to the user that now the gesture is completed and, that if no other gesture will invalidate the current gesture, the system will trigger the associated function once the indicated remaining time interval has elapsed. Although, in this example there is some implicit information that the user still needs to continue the current gesture, the user has actually to know how to continue the gesture.

The example for FB3 shows an implementation teaching the user how to actually continue the initial partial gesture to trigger a successful function launch. In the example, time point T1' indicates the application screen with two interactive UI objects F1, F2 while the user interacts with the system in a neutral position. At T2', the system detects a matching initial partial gesture—e.g. a left-turn movement which is associated with a predefined control gesture to trigger function F1. However, the current gesture does not yet match with the entire control gesture. From the identified predefined control gesture the system knows that in order to complete the current gesture the user needs to further continue the left-turn movement to reach a larger angle. Once the system has retrieved this information from the respective predefined control gesture, a visual guidance object VGO1 is displayed on the application screen. In the example, VGO1 is a bullet point which is moving in the direction GD1 in which the current gesture needs to be continued to trigger said function. Alternatively, a static display can convey similar information to the user. For example, a plurality of static bullet points may indicate different positions on a path reflecting the continuation of the current gesture. The user may perform the control gesture by starting with looking at the bullet point which is closest to the neutral area and then looking at the bullet points one by one, thus following the indicated gaze path. This embodiment is advantageous for recognizing so-called smooth pursuit eye movements. Typically, smooth pursuit movements require a stimulus as guidance for the user. With the visual guidance object, such as the bullet point or any other moving UI object, serving as such a stimulus, the set of predefined control gestures can include partial gestures corresponding to such smooth pursuit movements. This may be advantageous to filter out saccades so that fast or uncontrolled movements do not lead to accidental control instructions for unintentionally launching application functions. The use of visual guidance objects therefore improves the robustness against uncontrolled user movements as they may occur with handicapped users.

It is to be noted that, when the third feedback information element uses a dynamic confirmation feedback mode to guide the user's gesture to successful completion via a corresponding stimulus, the system has a reference which allows to check if the user follows the guidance or not. For example, in the case of static feedback, the system more or less is guessing whether the gesture performed by the user is completing a particular control gesture or not. For example, in the embodiment with static bullet points reflecting the expected gaze path the system may detect a head movement or an eye movement into the expected direction (in view of the corresponding feedback element). However, the system does not know whether this movement is actually performed in response to the display of the static visual guidance object or whether it is just a random movement caused by the user's handicap. When using a dynamic feedback mode instead, such as for example, the previously described moving bullet point or an animated gaze path presentation where the various bullet points sequentially appear on the screen, the system can determine whether the gesture performed by the user is in response to the stimulus. In other words, the system recognizes when the user performs an incremental movement after each new stimulus (i.e., intermediate positions of the visual guidance object) which is easily distinguishable from any random movement. For example, if the eyes (or the head posture) of the user follow sequentially each new bullet point appearing on the screen, the system uses the dynamic visual guidance object as a reference to determine if the user actually performs the gesture continuation in response to the corresponding feedback element. This allows the system to detect control gestures in an even more robust manner because random movements which are not performed in response to the stimulus (but nevertheless would lead to the completion of a control gesture) can be filtered out. Unintended function triggering can thus be avoided.

Alternatively, the arrow GD1 alone can be displayed as long as the user has not yet reached a position which completes the predefined control gesture. Alternatively, or as additional support, the interactive UI object F1 may be animated to indicate to the user whether he/she is performing the right partial gestures to complete the control gesture. For example, the size of F1 may be continuously increased while the incoming partial gestures of the current gesture match the corresponding partial gestures of the predefined control gesture until the gesture is finally completed. Alternatively, the color saturation or transparency level of the F1 object may be increased or decreased until the gesture is completed.

The third feedback information FB3 in combination with the second feedback information FB2 not only provides the user with confirmation feedback about when the intended function will finally be triggered but also provide active guidance with regards to what still needs to be done by the user within the remaining time interval in order to trigger a successful function launch of the application function. Again, the type of the visual guidance object VGO1 used by the system may be customizable by the user. Such feedback might also be peripherally perceptible by the user. Thus, even if the user performs an eye movement where the user looks beyond the display, the user still perceives the confirmation feedback. The option of having predefined control gestures which include movements where the user looks beyond the boundaries of the application GUI also addresses the Midas touch problem.

In certain implementations, the application screen may show multiple interactive UI objects in close vicinity to each other. In this case, there may be multiple predefined control gestures starting with the same initial partial sequence. In this embodiment, once the system has detected said initial partial gesture in the current gesture of the user, the confirmation feedback may further encode information regarding a plurality of options of how to continue the current gesture. Thereby, each option is associated with a different function to be triggered in case of the successful completion of a respective control gesture. In other words, the confirmation feedback may provide a list of all functions which are reachable with the already performed initial partial gesture and indicate to the user how to complete the gesture in order to reach any of the reachable functions.

Turning back to FIG. 3, in another example embodiment, FB3 can be provided using the audio feedback mode M2. For example, a speech generation function of the feedback generator may be used to output a spoken statement such as "you need to turn your head further to the left to launch function F1". Alternatively, the sound volume of a beep tone may indicate to the user that the right partial gestures are performed. For example, the volume may increase as long as the user performs the right movement up to a maximum level when the final position of the gesture is reached. A short beep tone may confirm the successful completion of the gesture. The loudness levels for the confirmation feedback can be again customized by the user.

In a third example embodiment, an indicator for FB3 can be provided using the haptic feedback mode M3. For example, different sequences of vibration alarms may be used to indicate to the user that a left-turn, right-turn, up-turn, or down turn movement should be continued by the user.

Figure 4:
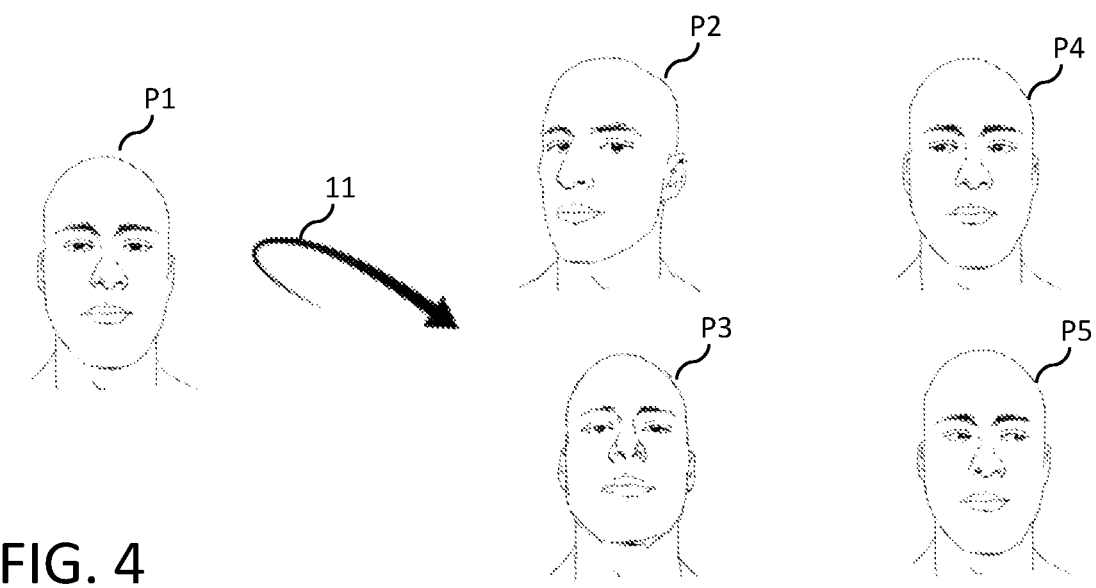
FIG. 4 illustrates multiple examples of control gestures according to different embodiments.

FIG. 4 illustrates examples of partial gestures performed with the head of the user. Initially, the user's head is looking straight on the application screen. This position P1 is referred to as a neutral position. It is assumed that the GUI of the application has no interactive functions objects which can get into the focus of the user while looking at the screen in such a neutral position. In order to control the application, the user performs the current gesture 11. Examples P2 and P3 relate gestures corresponding to a movement of a posture of the user's head. Head posture P2 shows a position of the user's head which is taken while the user turns the head to the right (from the user's perspective). Head posture P3 is a position of the user's head which is taken while the user turns the head upwards.

Figure 8A:
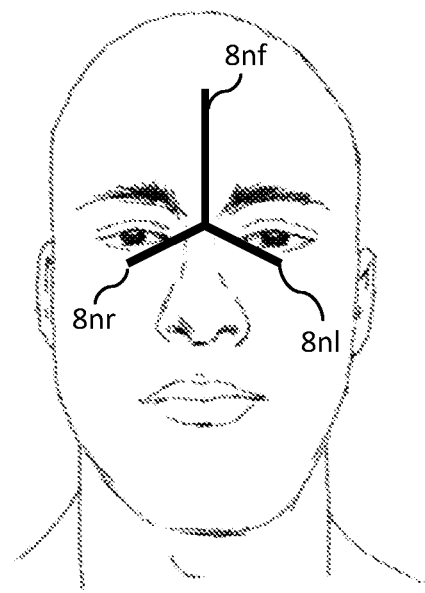
FIGS. 8A to 8C show three different head postures with information useful for head posture detection.
Figure 8B:
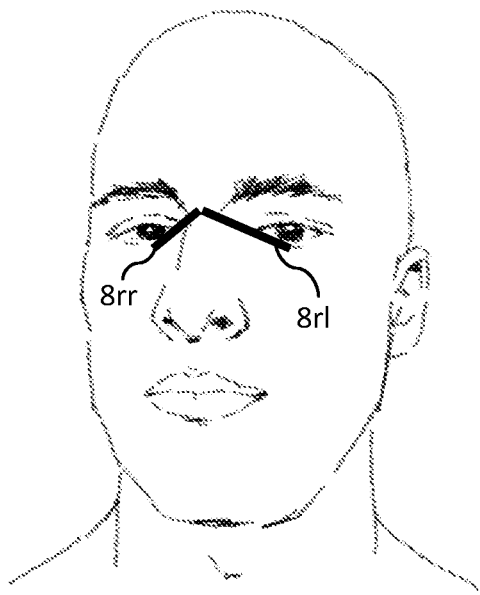
Figure 8C:
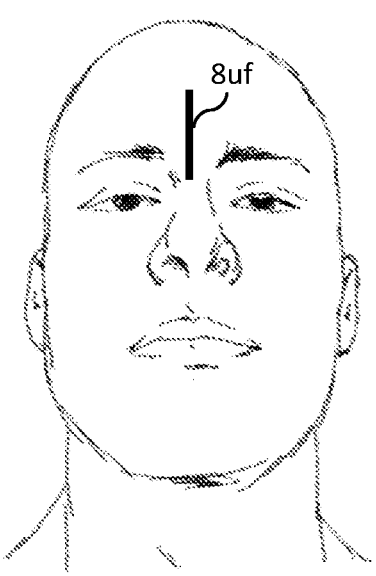

Turning briefly to FIGS. 8A to 8C, the example schematically illustrates how the head posture of the user can be determined by the system. Commercially available face recognition solutions are able to recognize characteristic nodes in a face of a user. These nodes define a unique pattern for each face which is characteristic of the user's face. In FIG. 8A a highly simplified pattern is shown for the user in a neutral position. The pattern includes a connection line $8nf$ between the user's root of the nose node and forehead node, and includes two connection lines $8nr$, $8nl$ between the user's root of the nose node and the right and left eyelid nodes, respectively. FIG. 8B illustrates how the length of the connection lines $8nr$, $8nl$ have changed when the user moves the head to the right. Now the connection line $8rr$ between the right eyelid and the nose root node is shorter than the connection line $8rl$ from the left eyelid to the nose root node. Based on the ratio of the changed connection lines between relevant face recognition nodes in different postures deviating from the neutral position, face recognition tools can be used to determine, for example, the turn angel of the head compared to the neutral position. Some face recognition tools thereby use neural networks which can be trained with image data from the user's face in all kinds of different postures. Such solutions typically have a high degree of accuracy in determining the current head posture of the user. Of course, as shown in FIG. 8C the up- or down movements can also be determined by using other connection lines, such as for example the connection line $8uf$ between the nose root node and the forehead node which is shorter in the up-posture than the corresponding line $8nf$ in the neutral position.

Turning back to FIG. 4, postures P4 and P5 illustrated another gesture mode, namely gestures which involve a movement or a viewing direction of the user's eyes. In posture P4, the user's head is in the neutral position but the user is looking to the right, whereas in P5, the user is looking to the left. Eye movements can be identified by standard eye-tracking applications which are commercially available for a long time. It is to be noted that predefined control gestures may even be composed of head movements and eye movements. This may be advantageous for certain types of handicaps of the users. For example, a user who is very limited in moving the head may customize the system to include predefined control gestures which include initial partial gestures corresponding to movements of the head which are within the range of physical capabilities of the user. However, such limited movements may not be robust against unintentional detection of control gestures. Therefore the partial head movement gesture may be completed by an additional partial eye movement gesture. For example, once the user has reached the maximum turn angle of the head, he/she may move the eyes further into that same direction to complete the control gesture.

FIG. 5 illustrates an embodiment supporting the control of menus wherein a menu corresponds to an application function F1 which provides a grouping of sub-functions F11, F12. Assuming that the user can trigger the function F1 with moving the head to posture P2, the application expands the menu F1 by showing the sub-functions F11, F12. In order to trigger sub-function F12 the user now needs to perform a gesture to move the head into the upright position P3. However, when the user intends to trigger sub-function F11, the user's head is already in position P2 from the previous control gesture. For this reason, the system does not recognize the current posture P2 as a control instruction for triggering F11. To actually trigger F11, the user first needs to leave the current posture P2, for example by moving back to a neutral position, and then needs to perform again the control gesture leading to posture P2. As the user is now in the application context of the menu, the gesture P2 is now recognized as a control instruction to launch the sub-function F11.

Figure 7:
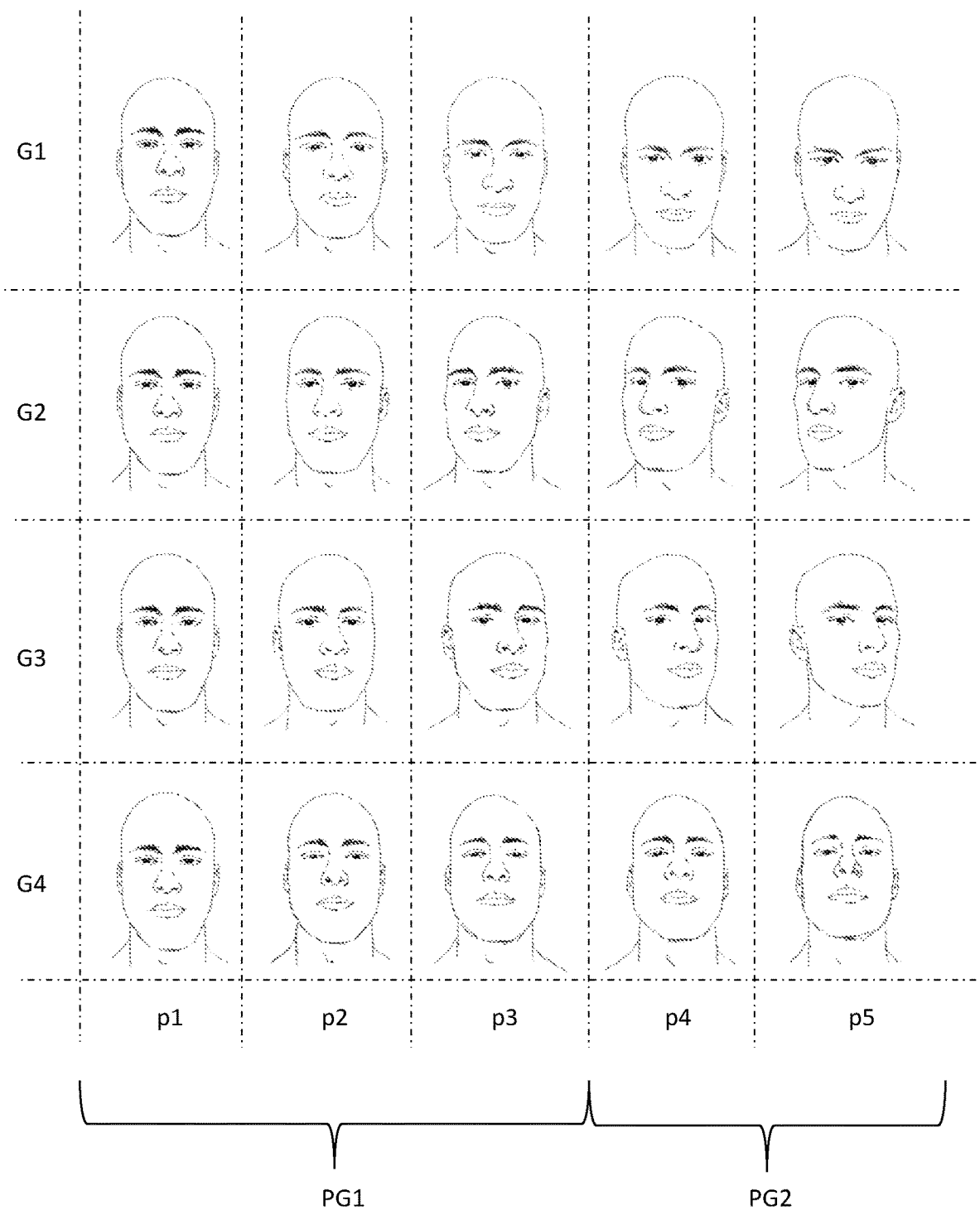
FIG. 7 illustrates four examples of control gestures by using various head postures.

FIG. 7 illustrates an example of four different control gestures G1 to G4 with each gesture being defined by five phases p1 to p5. In the example, each control gesture is thereby composed of two partial gestures: the initial partial gesture PG1 and the completing partial gesture PG2. The control gestures G1 is a gesture where the user moves the head downwards. G2 is a gesture where the user turns the lead to the right, and in G3 the user turns the head to the left. Finally, in G4 the user turns the head upwards. For all such predefined control gestures, the system would recognize a match of an initial partial gesture of the user's current gesture with the corresponding initial partial gesture PG1 of the respective control gesture. Once the initial partial gesture PG1 is recognized, the system provides the confirmation feedback to the user as disclosed herein. In the embodiment where the confirmation feedback also includes the third information on how to continue the current gesture to trigger a corresponding application function, the guiding information is derived from the information about the completing partial gesture information PG2 as provided by the corresponding predefined control gesture G1 to G4.

Figure 9:
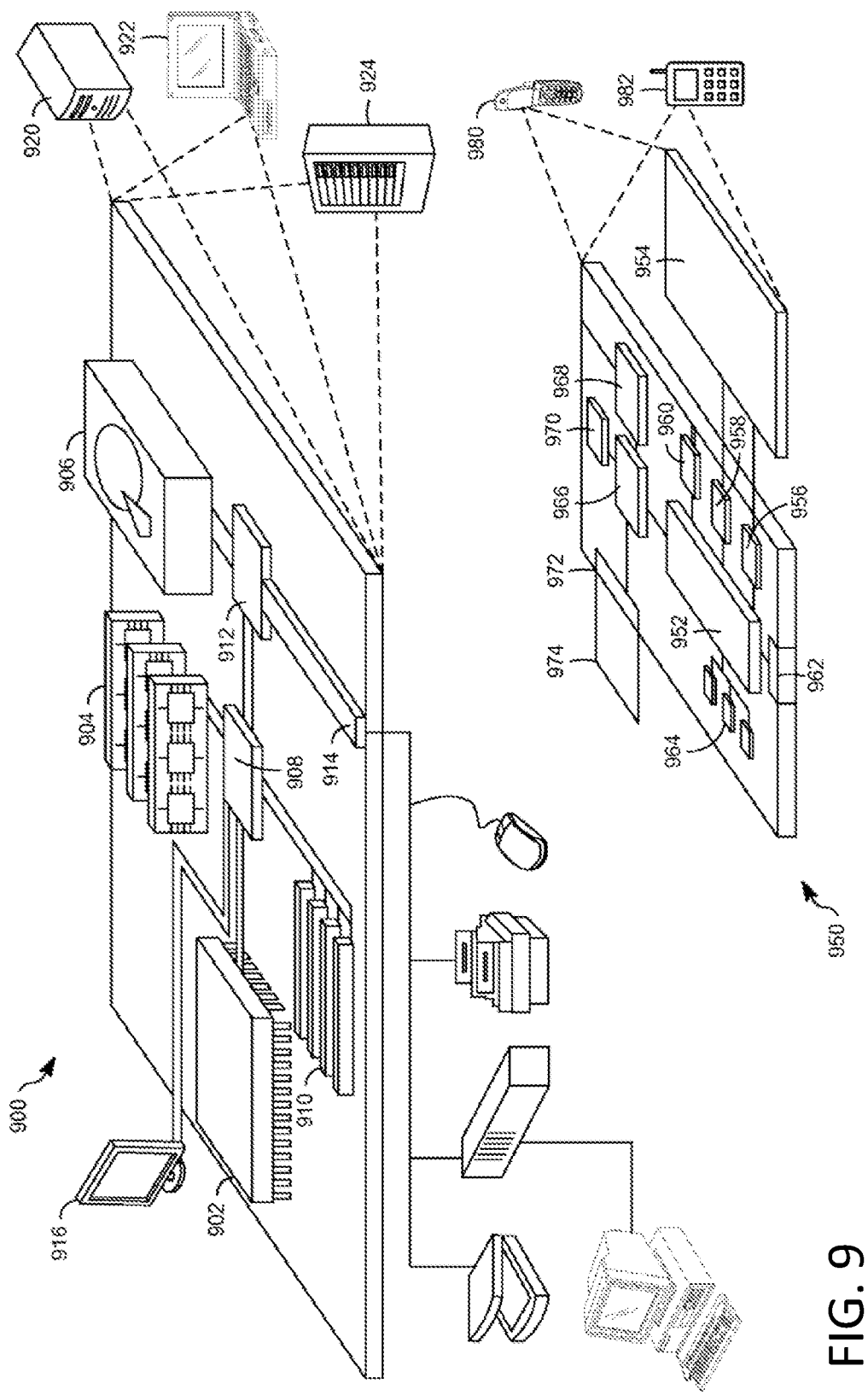
FIG. 9 is a diagram that shows an example of a generic computer device and a generic mobile computer device, which may be used with the techniques described here.

FIG. 9 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device 900 may correspond to the computer system 100 of FIG. 1. Computing device 950 is intended to represent various forms of mobile devices, such as personal digital assistants, cellular telephones, smart phones, and other similar computing devices. For example, computing device 950 may be used as a frontend by a user to interact with the computing device 900. For example, device 950 may also provide the frontend to interact with the application. The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or another similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the described embodiments.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer-implemented method for controlling an application running on a computing device, the method comprising:
   receiving a current gesture performed by a user while the user interacts with the application;
   comparing the current gesture with a plurality of predefined control gestures wherein at least one application function is associated with a respective control gesture;
   if the current gesture matches at least an initial partial gesture of a particular control gesture associated with the at least one function, generating confirmation feedback for the user wherein the confirmation feedback encodes, in a format perceptible by the user, at least a first information identifying the at least one application function (F1) associated with the particular control gesture and a second information about a time interval remaining before the associated application function will be executed; and
   if completion of the particular control gesture is detected during said time interval, and
   if a neutral position of the user is detected during said time interval, preventing the execution of the associated function;
   else if completion of the particular control gesture is detected during said time interval, and no neutral position is detected during said time interval, triggering the execution of the associated function.

2. The method of claim 1, wherein the confirmation feedback further encodes a third information about how to continue the current gesture to trigger the execution of the associated function.

3. The method of claim 1, wherein the confirmation feedback further encodes information regarding a plurality of options of how to continue the current gesture, with each option associated with a different function to be triggered in case of successful completion of a respective control gesture.

4. The method of claim 1, wherein the detected gesture comprises a movement or a posture of the head of the user.

5. The method of claim 1, wherein the detected gesture comprises a movement or a viewing direction of the user's eyes.

6. The method of claim 1, wherein the confirmation feedback is provided in any one or by a combination of the following feedback modes: visual feedback, audible feedback, or haptic feedback.

7. The method of claim 1, wherein the associated function represents a function menu item grouping a subset of sub-functions, the method further comprising:
   upon triggering the associated function, repeating the steps from receiving to triggering wherein the current gesture is compared only with predefined control gestures associated with the sub-functions of said subset.

8. A computer system, including a processor and memory, for controlling an application running on a computing device, the system comprising:
- an interface configured to receive a current gesture performed by a user while the user interacts with the application;
- a gesture detection module configured to access a plurality of predefined control gestures, and to compare the current gesture with the plurality of predefined control gestures wherein at least one application function is associated with a respective control gesture, and to detect if the current gesture matches at least an initial partial gesture of a particular control gesture associated with the at least one application function;
- a feedback generator module configured to generate confirmation feedback for the user if the current gesture matches at least an initial partial gesture of the particular control gesture, wherein the confirmation feedback encodes, in a format perceptible by the user, at least a first information identifying the application function associated with the particular control gesture and a second information about a time interval remaining before the associated application function will be executed; and
- the application configured to trigger the execution of the associated function if the particular control gesture is completed during said time interval and no neutral position of the user is detected during said time interval, and further configured to prevent the execution of the associated function if completion of the particular control gesture is detected during said time interval, and a neutral position of the human user is detected during said time interval.

9. The system of claim 8, wherein the confirmation feedback further encodes a third information about how to continue the current gesture to trigger the execution of the associated function.

10. The system of claim 8, wherein the confirmation feedback further encodes information regarding a plurality of options of how to continue the current gesture, with each option associated with a different function to be triggered in case of successful completion of a respective control gesture.

11. The system of claim 8, wherein the detected gesture comprises a movement or a posture of the head of the user.

12. The system of claim 8, wherein the detected gesture comprises a movement or a viewing direction of the user's eyes.

13. The system of claim 8, wherein the confirmation feedback is provided in any one of the following feedback modes: visual feedback, audible feedback, or haptic feedback.

14. The system of claim 8, wherein the associated function represents a function menu item grouping a subset of sub-functions, the system further configured to:
- upon triggering the associated function, prevent the execution of a sub-function based on the current gesture, and re-execute gesture recognition wherein a subsequent current gesture is compared only with predefined control gestures associated with the sub-functions of said subset.

15. A non-transitory computer program product that, when loaded into a memory of a computing device and executed by at least one processor of the computing device, causes the computing device to:
- receive a current gesture performed by a user while the user interacts with the application;
- compare the current gesture with a plurality of predefined control gestures wherein at least one application function is associated with a respective control gesture;
- if the current gesture matches at least an initial partial gesture of a particular control gesture associated with the at least one function, generate confirmation feedback for the user wherein the confirmation feedback encodes, in a format perceptible by the user, at least a first information identifying the at least one application function (F1) associated with the particular control gesture and a second information about a time interval remaining before the associated application function will be executed; and
- if completion of the particular control gesture is detected during said time interval, and
- if a neutral position of the user is detected during said time interval, prevent the execution of the associated function;
- else if completion of the particular control gesture is detected during said time interval, and no neutral position is detected during said time interval, trigger the execution of the associated function.

16. The non-transitory computer program product of claim 15, wherein the confirmation feedback further encodes a third information about how to continue the current gesture to trigger the execution of the associated function.

17. The non-transitory computer program product of claim 15, wherein the confirmation feedback further encodes information regarding a plurality of options of how to continue the current gesture, with each option associated with a different function to be triggered in case of successful completion of a respective control gesture.

18. The non-transitory computer program product of claim 15, wherein the detected gesture comprises a movement or a posture of the head of the user.

19. The non-transitory computer program product of claim 15, wherein the detected gesture comprises a movement or a viewing direction of the user's eyes.

20. The non-transitory computer program product of claim 15, wherein the confirmation feedback is provided in any one or by a combination of the following feedback modes: visual feedback, audible feedback, or haptic feedback.

* * * * *